United States Patent
Chen et al.

(10) Patent No.: US 11,055,872 B1
(45) Date of Patent: Jul. 6, 2021

(54) REAL-TIME OBJECT RECOGNITION USING CASCADED FEATURES, DEEP LEARNING AND MULTI-TARGET TRACKING

(71) Applicant: HRL Laboratories, LLC, Malibu, CA (US)

(72) Inventors: Yang Chen, Westlake Village, CA (US); Deepak Khosla, Camarillo, CA (US); Ryan M. Uhlenbrock, Calabasas, CA (US)

(73) Assignee: HRL Laboratories, LLC, Malibu, CA (US)

(*) Notice: Subject to any disclaimer, the term of this patent is extended or adjusted under 35 U.S.C. 154(b) by 157 days.

(21) Appl. No.: 15/883,822

(22) Filed: Jan. 30, 2018

Related U.S. Application Data

(60) Provisional application No. 62/479,204, filed on Mar. 30, 2017.

(51) Int. Cl.
  *G06T 7/73* (2017.01)
  *G06T 7/246* (2017.01)
  *G06N 3/02* (2006.01)

(52) U.S. Cl.
  CPC .............. *G06T 7/73* (2017.01); *G06N 3/02* (2013.01); *G06T 7/246* (2017.01); *G06T 2207/20081* (2013.01)

(58) Field of Classification Search
  None
  See application file for complete search history.

(56) References Cited

U.S. PATENT DOCUMENTS

| | | | | |
|---|---|---|---|---|
| 8,224,029 | B2* | 7/2012 | Saptharishi | G06K 9/00718 382/103 |
| 8,515,184 | B1* | 8/2013 | Medasani | G06K 9/6257 382/224 |
| 9,430,829 | B2* | 8/2016 | Madabhushi | G06T 7/0012 |
| 9,443,320 | B1* | 9/2016 | Gaidon | G06K 9/00 |
| 10,111,632 | B2* | 10/2018 | Anavi | G06K 9/6269 |
| 2013/0279808 | A1* | 10/2013 | Levi | G06K 9/00362 382/192 |

(Continued)

FOREIGN PATENT DOCUMENTS

| CN | 106529448 A | * | 3/2017 | |
|---|---|---|---|---|
| WO | WO-2017182225 A1 | * | 10/2017 | G06K 9/00771 |

OTHER PUBLICATIONS

Chen X, Wei P, Ke W, Ye Q, Jiao J. Pedestrian detection with deep convolutional neural network. InAsian Conference on Computer Vision Nov. 1, 2014 (pp. 354-365). Springer, Cham. (Year: 2014).*

(Continued)

*Primary Examiner* — Michelle M Entezari
(74) *Attorney, Agent, or Firm* — Tope-McKay & Associates

(57) ABSTRACT

Described is a system for real-time object recognition. The system extracts a candidate target region representing a candidate object from an input image of a scene based on agglomeration of channel features. The candidate target region is classified using a trained convolutional neural network (CNN) classifier, resulting in an initial classified object. A multi-target tracker is used for tracking the classified objects for final classification of each classified object, resulting in a final output, and a device is controlled based on the final output.

20 Claims, 16 Drawing Sheets

(56) References Cited

U.S. PATENT DOCUMENTS

| | | | | |
|---|---|---|---|---|
| 2015/0063688 | A1* | 3/2015 | Bhardwaj | G06K 9/3258 |
| | | | | 382/159 |
| 2015/0186736 | A1* | 7/2015 | Han | G06K 9/00805 |
| | | | | 382/103 |
| 2016/0292522 | A1* | 10/2016 | Chen | B66B 1/3476 |
| 2017/0032676 | A1* | 2/2017 | Mesmakhosroshahi | |
| | | | | G06K 9/00369 |
| 2017/0039444 | A1* | 2/2017 | Li | G06K 9/4647 |
| 2017/0099200 | A1* | 4/2017 | Ellenbogen | H04L 43/04 |
| 2017/0124415 | A1* | 5/2017 | Choi | G06N 3/08 |
| 2017/0344838 | A1* | 11/2017 | Zhou | G06T 7/77 |
| 2018/0005079 | A1* | 1/2018 | Tosic | G06K 9/00664 |
| 2018/0253839 | A1* | 9/2018 | Zur | G06T 7/0012 |
| 2019/0130215 | A1* | 5/2019 | Kaestle | G06K 9/00771 |

OTHER PUBLICATIONS

Xu Y, Qin L, Li G, Huang Q. Online discriminative structured output SVM learning for multi-target tracking. IEEE Signal Processing Letters. Jan. 9, 2014;21(2):190-4. (Year: 2014).*

Verma, A., Hebbalaguppe, R., Vig, L., Kumar, S. and Hassan, E., 2015. Pedestrian detection via mixture of CNN experts and thresholded aggregated channel features. In Proceedings of the IEEE International Conference on Computer Vision Workshops (pp. 163-171). (Year: 2015).*

Brauer H, Grecos C, von Luck K. Robust False Positive Detection for Real-Time Multi-target Tracking. InInternational Conference on Image and Signal Processing Jun. 30, 2014 (pp. 450-459). Springer, Cham. (Year: 2014).*

Ju J, Kim D, Ku B, Han DK, Ko H. Online multi-person tracking with two-stage data association and online appearance model learning. IET Computer Vision. Jul. 18, 2016;11(1):87-95. (Year: 2016).*

Castangia, Luca, et al. "A coarse-to-fine vehicle detector running in real-time." 17th International IEEE Conference on Intelligent Transportation Systems (ITSC). IEEE, 2014. (Year: 2014).*

Wonneberger, Stefan, et al. "Parallel feature extraction and heterogeneous object-detection for multi-camera driver assistance systems." 2015 25th International Conference on Field Programmable Logic and Applications (FPL). IEEE, 2015. (Year: 2015).*

CN 106529448 A [Machine Translation] (Year: 2017).*

Cao, Jiale, Yanwei Pang, and Xuelong Li. "Learning multilayer channel features for pedestrian detection." IEEE transactions on image processing 26.7 (2017): 3210-3220. (Year: 2017).*

Wang, Dongdong, et al. "Traffic sign detection using a cascade method with fast feature extraction and saliency test." IEEE Transactions on Intelligent Transportation Systems 18.12 (2017): 3290-3302. (Year: 2017).*

Ghorban, Farzin, et al. "Aggregated channels network for real-time pedestrian detection." Tenth International Conference on Machine Vision (ICMV 2017). vol. 10696. International Society for Optics and Photonics, 2018. (Year: 2018).*

P. Luo, X. Zeng, X. Wang, and X. Tang. Switchable deep network for pedestrian detection. CVPR, 2014, pp. 893-906.

W. Ouyang and X. Wang. Joint deep learning for pedestrian detection. ICCV, 2013, pp. 2056-2063.

A. Angelova, A. Krizhevsky, V. Vanhoucke, A. Ogale, D. Ferguson, Real-Time Pedestrian Detection With Deep Network Cascades, British Machine Vision Conference (BMVC), 2015, pp. 1-12.

Dollar, P., et al., "Integral channel features," In: British Machine Vision Conference, vol. 2, 2009.

Bin Yang, J. Yan, Z. Lei and S. Z. Li, "Aggregate channel features for multi-view face detection," IEEE International Joint Conference on Biometrics, Clearwater, FL, 2014, pp. 1-8.

* cited by examiner

| Data Sets | MAN | nontarget | Comments |
|---|---|---|---|
| Training | 529,302 | 627,264 | Including ~53k hard negative "nontarget" for training |
| Validation | 19,603 | 19,629 | |
| Test | 145,640 | 169,450 | For the "blind test" |

FIG. 6

| CNN Models (training data) | Validation Accuracy (error) (%) | Blind Test Accuracy (error) (%) | Blind Test Hard Negative Accuracy (error) (%) |
|---|---|---|---|
| Baseline CNN for Cascade (hn1) | 99.71 (0.29) | 99.81 (0.19) | 98.48 (1.52) |
| DeepNet4-Cascade44AA (hn1) | 99.79 (0.21) | 99.88 (0.12) | 98.59 (1.41) |
| DeepNet4-Cascade44AA (hn3) | 99.88 (0.12) | 99.86 (0.14) | 99.90 (0.1) |

FIG. 7

| Data Sets | MAN | nontarget | Comments |
|---|---|---|---|
| Training | 529,281 | 909,513 | Including 753k hard negatives and random samples |
| Validation | 19,609 | 19,774 | |
| Test | 147,729 | 136,350 | For the "blind" test |

FIG. 8

| CNN Models (training data) | % Validation Accuracy (error) | % Blind Test Accuracy (error) | Blind Test Hard Negative Accuracy (error) (%) | |
|---|---|---|---|---|
| | | | 8-bit | 16-bit |
| DeepNet4-Cascade44AAg (hn2) | 99.63 (0.37) | 99.30 (0.70) | 97.51 (2.49) | 99.39 (0.61) |

FIG. 9

REAL-TIME OBJECT RECOGNITION USING CASCADED FEATURES, DEEP LEARNING AND MULTI-TARGET TRACKING

GOVERNMENT LICENSE RIGHTS

This invention was made with government support under U.S. Government Contract Number P000014202. The government may have certain rights in the invention.

CROSS-REFERENCE TO RELATED APPLICATIONS

This is a Non-Provisional patent application of U.S. Provisional Application No. 62/479,204, filed in the United States on Mar. 30, 2017, entitled, "Real-Time Object Recognition Using Cascaded Features, Deep Learning and Multi-Target Tracking," the entirety of which is hereby incorporated by reference.

BACKGROUND OF INVENTION

(1) Field of Invention

The present invention relates to a system for object recognition and, more particularly, to a system for object recognition in both electro-optical (EO) and infrared (IR) imagery.

(2) Description of Related Art

Object recognition is a process for identifying a specific object in a digital image or video. Humans recognize objects in images with little effort, even if the image of the objects may vary in different viewpoints, different sizes and scales, or even when the images are translated or rotated. Humans can even recognize objects when they are partially obstructed from view. Object recognition remains a challenge for computer vision systems. Many approaches to addressing this challenge have been implemented.

For instance, Ouyang et al. (W. Ouyang and X. Wang, "Joint Deep Learning for Pedestrian Detection," ICCV, 2013) and Luo et al. (P. Luo, X. Zeng, X. Wang, and X. Tang, "Switchable Deep Network for Pedestrian Detection," CVPR, 2014) both apply deep neural networks (DNN) in combination with fast feature cascades to object recognition. However, Ouyang et al. and Luo et al. use DNNs only on processed, edge-like features rather than raw pixel input, which is a disadvantage in speed and accuracy. Their methods are also only for color image processing. They have low accuracy in occlusion/clutter and in fast moving scenes.

Angelova et al. (A. Angelova, A. Krizhevsky, V. Vanhoucke, A. Ogale, D. Ferguson, "Real-Time Pedestrian Detection with Deep Network Cascades," British Machine Vision Conference (BMVC), 2015) presented an approach that cascades deep neural networks and fast features for fast and accurate pedestrian detection. They used a pre-trained deep neural network that has been pre-trained using ImageNet data. Their method is also only applicable for color image processing. They also have low accuracy in occlusion/clutter and in fast moving scenes.

Thus, a continuing need exists for an approach to object recognition that is applicable to both color (also known as electro-optical, or simply EO) and infrared (IR) images and videos, and improves accuracy in occlusion/clutter and in fast moving scenes, thereby improving object recognition technologies.

SUMMARY OF INVENTION

The present invention relates to a system for object recognition and, more particularly, to a system for object recognition in both electro-optical (EO) and infrared (IR) imagery. The system comprises one or more processors and a non-transitory computer-readable medium having executable instructions encoded thereon such that when executed, the one or more processors perform multiple operations. The system extracts a target region from an input image of a scene based on agglomeration of channel features, wherein the candidate target region represents a candidate object. The candidate target region is classified using a trained convolutional neural network (CNN) classifier, resulting in an initial classified object. Using a multi-target tracker, the classified objects are tracked for final classification of each classified object, resulting in a final output. A device is controlled based on the final output.

In another aspect, extracting candidate target regions includes computing channel feature vectors for image frames of a video, and for each image frame, a first classifier is applied at multiple image scales and across the entire image frame.

In another aspect, the CNN classifier is implemented as interacting software modules comprising a CNN interface and a CNN server, wherein the CNN interface displays results received from the CNN server.

In another aspect, the trained CNN is used for both electro-optical (EO) and infrared (IR) image classification.

In another aspect, the system compares at least one candidate target region to an output of the multi-target tracker to determine if further classification by the CNN classifier is needed.

In another aspect, an output of the multi-target tracker includes a tracker bounding box, and wherein if no candidate target regions overlap a tracker bounding box by an overlap threshold, then the tracker bounding box is sent to the CNN classifier for further classification.

In another aspect, the system trains a first classifier for extracting the candidate target region. The first classifier is trained by: generating positive training samples by extracting ground-truth samples of a target object from a set of training videos; generating negative training samples by extracting a set of images from background images in the set of training videos that contain no ground-truth objects; and in a first round of training, extracting a set of random image regions from the background images, resulting in a set of random negative images, and generating an initial first classifier using feature vectors extracted from the positive training samples and the set of random negative images.

In another aspect, in additional rounds of training, the system applies the initial first classifier on the background images containing no target objects and extracts a set of regions that produce classifier responses higher than a set threshold, resulting in a set of hard negatives; adds the set of hard negatives to the set of random negative images to generate an expanded negative training set; and generates the trained first classifier using feature vectors extracted from the positive training samples and the expanded negative training set.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 6 is a table illustrating data sets used for training, validation, and testing for a baseline CNN and a deep CNN according to some embodiments of the present disclosure;

FIG. 7 is a table illustrating performance of a CNN on validation and blind test sets according to some embodiments of the present disclosure;

FIG. 8 is a table illustrating data used to train a two-class deep CNN according to some embodiments of the present disclosure;

FIG. 9 is a table illustrating training and testing results according to some embodiments of the present disclosure;

DETAILED DESCRIPTION

Figure 1:
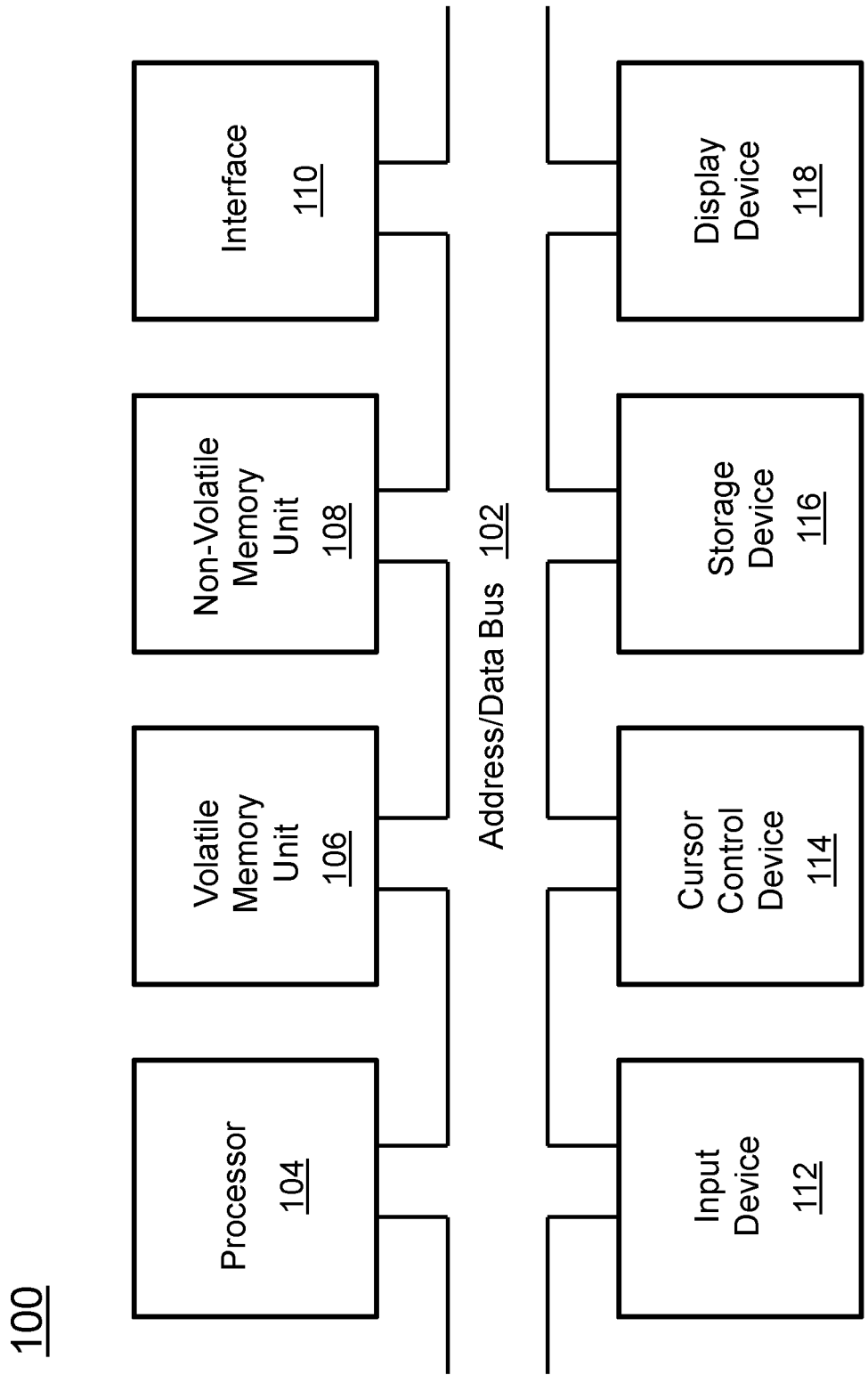
FIG. 1 is a block diagram depicting the components of a system for object recognition according to some embodiments of the present disclosure.

The present invention relates to a system for object recognition and, more particularly, to a system for object recognition in both electro-optical (EO) and infrared (IR) imagery. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for object recognition. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
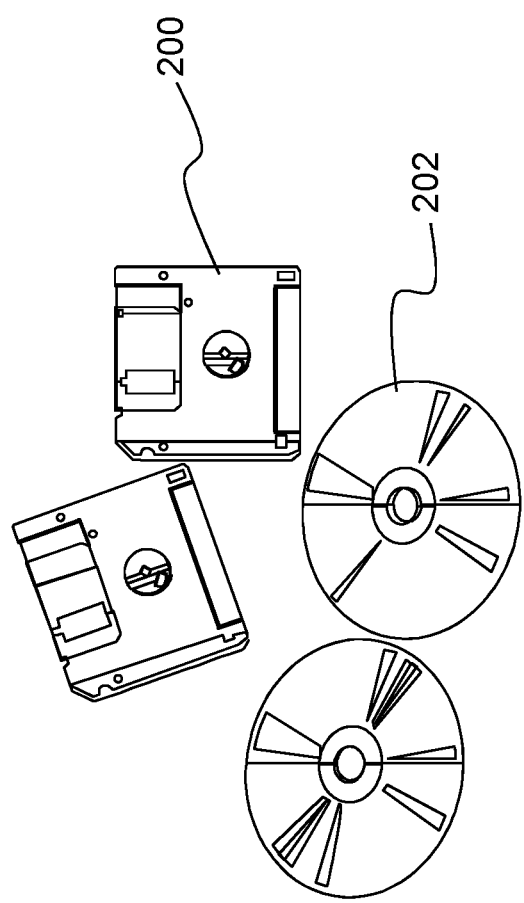
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

Described is an efficient cascaded system for high accuracy and fast target recognition in both electro-optical (EO) and infrared (IR) imagery from stationary and moving platforms. Some unique aspects of the invention of this disclosure include, but are not limited to, one or more of the following: 1) a three-stage classifier system that is applicable to both EO and IR imagery; 2) use of a custom-designed and trained deep learning Convolutional Neural Net (CNN); 3) a training process that includes hard negative mining; 4) a multi-tracker that tracks classified objects as well as feeds into the CNN classifier for higher accuracy; and 5) an integrated system that combines all of the above into a single pipeline. The cascaded classifier described herein is robust to data type (EO or IR), changing environment, and appearance due to changing viewing angles, lighting, and object size. Upon review of the system described below and corresponding performance evaluations, it is evident that this disclosure provides a marked improvement to the technical field and technologies as used for object recognition.

(2.1) System

Figure 3:
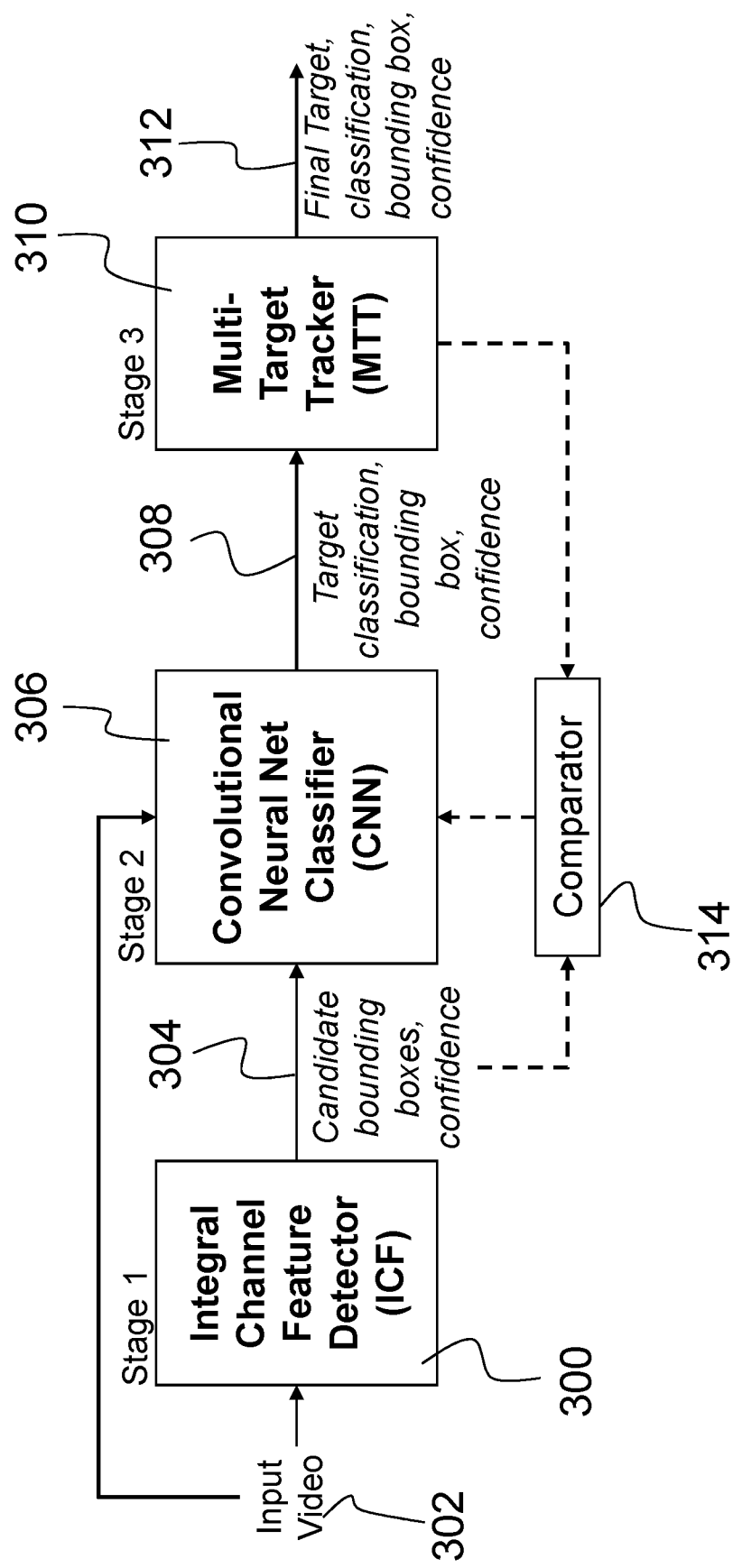
FIG. 3 is a block diagram illustrating of the system for object recognition according to some embodiments of the present disclosure.

Some embodiments described herein include a three-stage cascaded classifier for target recognition in EO and IR videos from static or moving platforms, as depicted in FIG. 3. Other embodiments may include fewer or more stages. In some embodiments, Stage 1 of the classifier is an Integral Channel Features (ICF) detector 300 (e.g., a first classifier) that takes in input video 302 and runs fast (>frames per second) to give high-confidence candidate target regions as bounding boxes 304 and confidence scores (e.g., a human target labeled as "MAN", with a confidence score 0.6) in the input video 302. In some embodiments, the target regions are then fed through a Stage 2 convolutional neural net (CNN) classifier 306 (e.g., a second classifier) that outputs target class, location, and confidence scores (element 308). Confidence scores referred herein are numeric values either normalized (values for all possible class labels sum up to 1.0) or unnormalized, and generated from the specific neural network models from image input.

In some embodiments, Stage 3 is a multi-target tracker (MTT) 310 that tracks the target boxes from the CNN stage for final target classification, locations, and confidence scores (element 312). The track confidence score is computed by averaging the CNN classifier confidence score (element 308) of assigned target boxes to that track over a pre-determined number of frames (e.g., 16 in one embodiment). In other embodiments, it can be the maximum score over these frames instead of the average. In an alternative embodiment, the tracker 310 results are fed to a comparator 314 for further processing by the CNN stage (element 306).

(2.1.1) Stage 1: Integral Channel Feature (ICF) Detector (Element 300)

The integral channel features (ICF) are based on agglomeration of "channel features" and the training of small decision trees using these features. Basic features can be thought of as maps from raw pixel values (RGB (red, green, blue)/IR (infrared)) to more informative features such as oriented gradients, Haar features, difference of regions, or simply pixel values after color-space transformations (such as LUV). This is known to persons having ordinary skill in the art and adapted for the system according to embodiments of the present disclosure.

For EO data, the method described herein makes use of oriented edges, magnitude of gradients, and the LUV color space. For IR data, for some embodiments, only the intensity values are used in addition to oriented edges and magnitude of gradients. These features can then be used to form a feature channel. Each channel is simply summing pixel values over a rectangular region within an individual image window, which can be efficiently accomplished through the use of integral image, hence the name of integral channel features, or ICF. These channel features are finally used in a boosted learning approach to create a detector which can classify the regions of interest.

The ICF-based detector 300 according to embodiments of this disclosure can learn a model of size 64×128 pixels for objects of canonical size 48×96 pixels. The features used to learn this model are obtained by computing channel features across all or many possible sizes of rectangles (spaced 4 pixels apart) that can fit within the model window size. Thus, each image region of 64×128 yields about 39K ("K" denotes "thousand") integral channel features (or a feature vector with ~39K dimensions), and the set of feature vectors, one from each training sample, is then used to train a decision tree classifier having 2000 levels. The paradigm used to train the final detector is Adaboost. The trained ICF classifier model is then applied at various scales (~10 is optimal for accuracy and speed) in a sliding window fashion across an input image. A scale is a numerical factor used to resize an input image in both dimensions. A scale of <1.0 will effectively shrink the input image, whereas a scale of >1.0 will enlarge the input image. The set of scales is chosen appropriately so that the input image is resized so that the fixed 64×128 detector size in the resized input image is at a similar size to the size of the object in one or more scales even though the actual size of the object in the original input may be different.

(2.1.2) Stage 2: Convolutional Neural Network Classifier (CNN) (Element 306)

Figure 4:
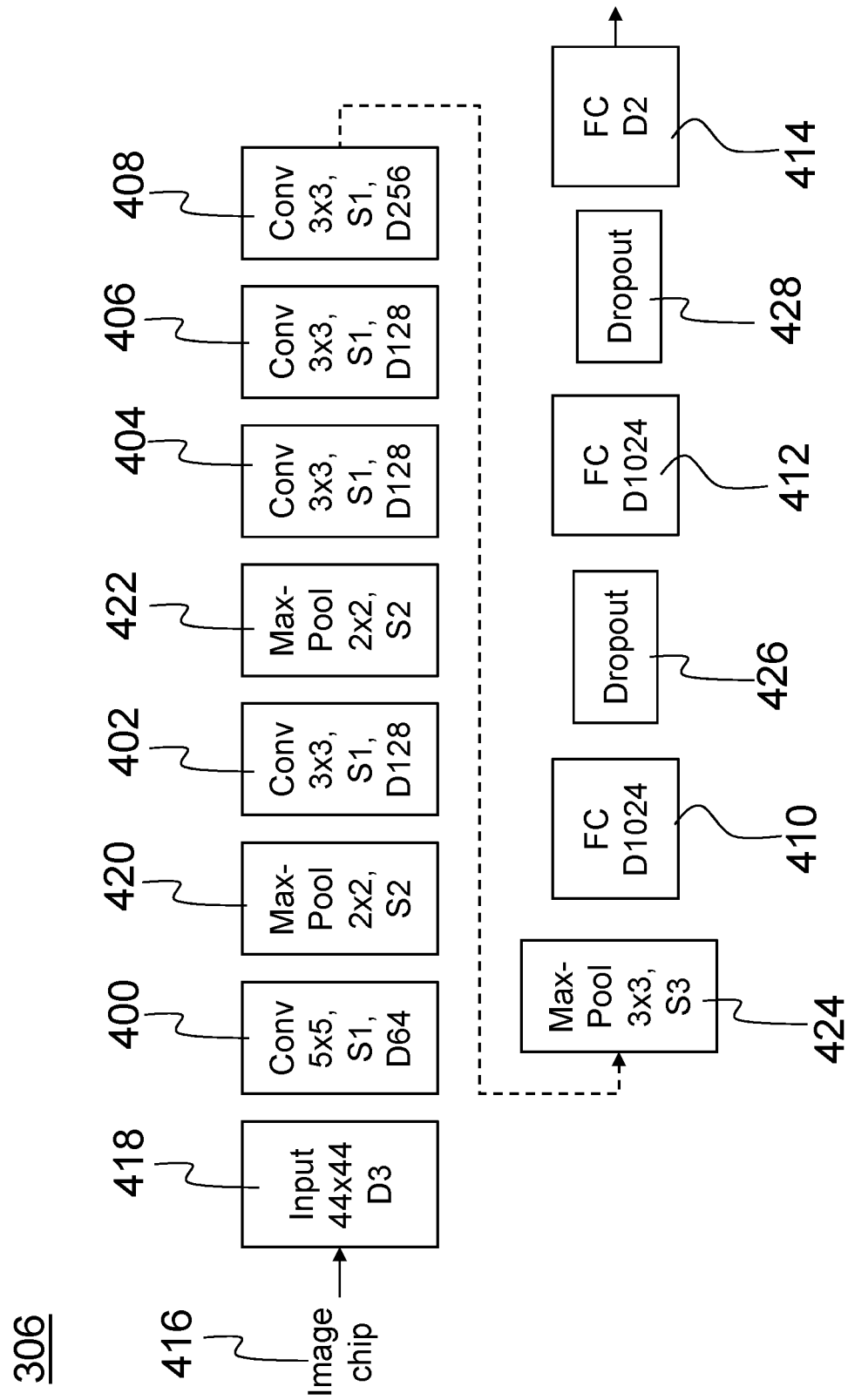
FIG. 4 is an illustration of the architecture of the convolutional neural network (CNN) for electro-optical (EO) data according to some embodiments of the present disclosure.

The second stage is a convolutional neural network (CNN) 306 for EO and IR data classification. FIG. 4 illustrates a custom designed CNN architecture for EO data with 5 convolution layers (Conv (elements 400, 402, 404, 406, and 408)) and 3 fully connected (FC (elements 410, 412, and 414)) layers. The CNN architecture takes an image chip 416 as input, followed by an input layer 418. Each Conv layer (e.g., 400) is followed by a layer of ReLU non-linearity units which are omitted from the illustration. Additionally, the CNN 306 includes several max-pool layers (elements 420, 422, and 424) and dropout layers (elements 426 and 428). In the layers shown, S=stride, the step size in spatial sampling; D=depth (of feature map produced by the layer); and n×n=spatial size of the convolution kernels.

Figure 5:
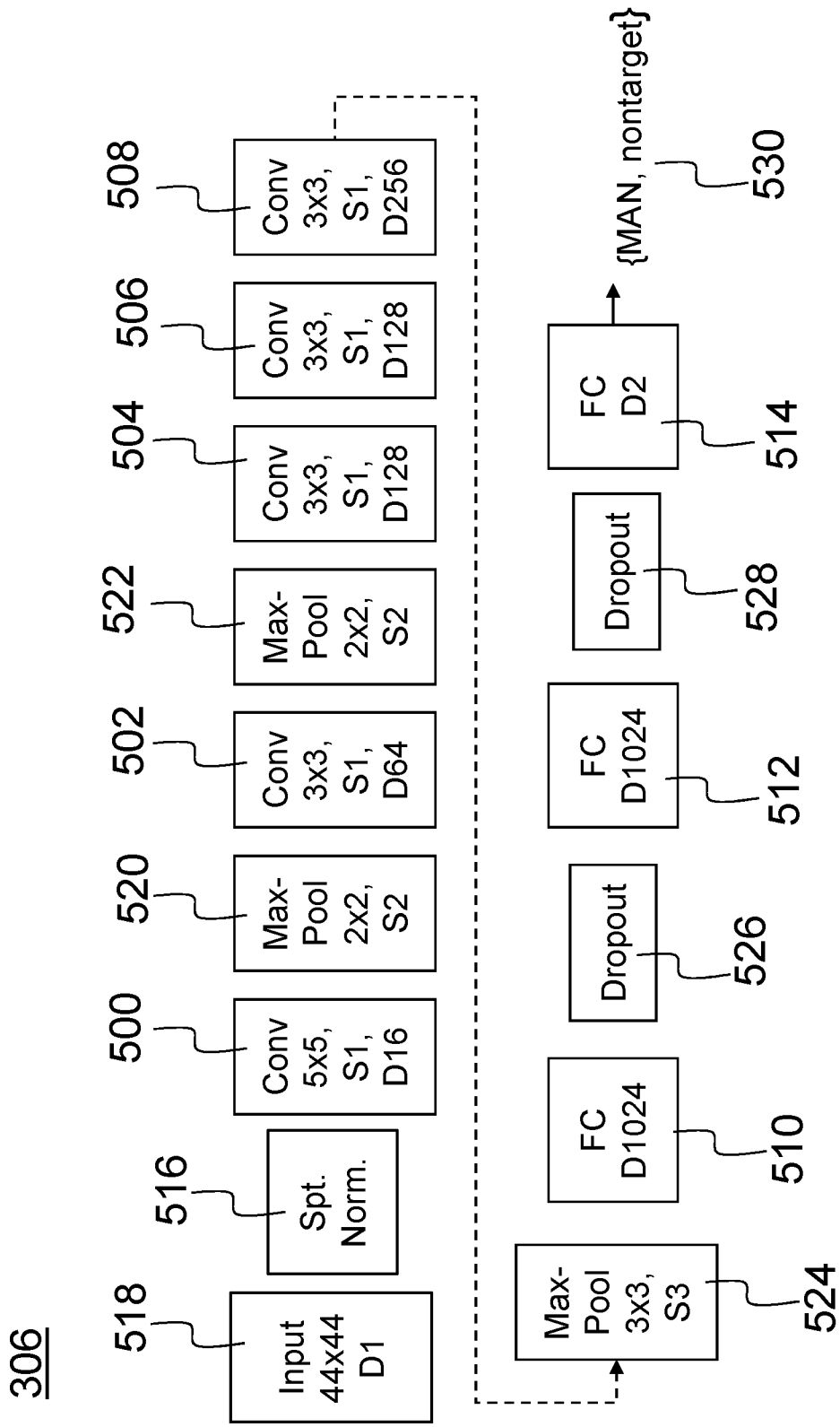
FIG. 5 is an illustration of the architecture of the CNN for infrared (IR) data according to some embodiments of the present disclosure.

The CNN architecture for IR includes further customization, and is depicted in FIG. 5. As with the EO architecture, each Conv layer (elements 500, 502, 504, 506, and 508) is followed by a layer of ReLU non-linearity units which are omitted from the illustration. In FIG. 5, S=stride, the step size in spatial sampling; D=depth (of feature map produced by the layer), n×n=spatial size of the convolution kernels; and Spt. Norm=Spatial Contrast Normalization. The CNN for IR further includes an input layer (element 518), max-pool layers (elements 520, 522, and 524), and dropout layers (elements 526 and 528). A contrast normalization block 516 was added at the front end with 7×7 neighborhood (i.e., the contrast normalized value of each image pixel is obtained by subtracting the mean from the original value, followed by division by the standard deviation: the mean and standard deviation are computed from the 7×7 neighborhood of the pixel in question). This processing allows the input to the subsequent convolution layers (elements 500, 502, 504, 506, and 508) to be immune from or less affected by changes in absolute image intensities and enhances the overall robustness of the system. Feature map sizes for the $1^{st}$ and $2^{nd}$ convolution layers (elements 500 and 502, respectively) are adjusted to fit single hand (grayscale) input. The final output (element 530) is the classification of the object as a target (e.g., MAN) or nontarget (e.g., an initial classification).

(2.1.3) Stage 3: Multi-Target Tracker (MTT)(Element 310)

The system described herein includes a multi-target Kalman filter tracker 310 as a third and final stage to track targets from the cascaded classifier system. This helps generate smooth tracks and improves overall recognition accuracy. The cascaded classifier's (stages 1 and 2) outputs for each video frame are used as measurements in the tracker. Non-maximum suppression and other heuristics were applied to identify and eliminate false alarm tracks. For example, track duration is a heuristic that represents the number of frames of continuous track. Track score is track confidence, as described above. For instance, if track duration is less than 32, and confidence score is less than 0.2, a track is rejected. The Kalman filter is used to predict the centroid of each track in the current frame, and update its bounding box accordingly. The width and height of the bounding box in the previous frame is used as the current prediction of the size. The cost is computed using a bounding box overlap ratio between the predicted bounding box and the classified bounding box. The Kuhn-Munkres Algorithm (also known as the Hungarian algorithm) is used to compute an assignment which minimizes the total cost. The track outputs are then the final outputs (element 312) from the overall system (e.g., a final classification).

In the alternative embodiment shown in FIG. 3, the output of the tracker 310 is sent into a comparator 314. The comparator 314 compares the detected output from the first stage (element 304) against the tracker output. If no detected output box overlaps a track output box by a pre-determined threshold (e.g., >90%, >75%, >60%, an overlap threshold), then the tracker output box is sent through the CNN stage (element 306) for further classification. This process maintains better track continuity and can lead to overall higher accuracy.

(2.2) Experimental Studies

The invention described herein was implemented and tested for the task of recognizing dismounts (e.g., human targets labeled as "MAN") and their activities in both EO and IR videos from stationary and moving ground vehicles.

(2.2.1) ICF Classifier Training

To train the ICF detector/classifier (element 300), ground-truth samples of the object ("MAN") were extracted from all training videos and resized to the canonical size of 64×128 as positive training samples. For negative training samples, a set of video image frames from the training videos were extracted that contain no ground-truth objects anywhere in the image. These images are called "background" images. The ICF classifier (element 300) training is conducted in 3 bootstrapping rounds.

In the first round, a set of 50,000 random image regions from the background images were extracted. Additionally, 100,000 positive training samples and 50,000 random negative samples go through feature extraction (i.e., 39,000 dimensional feature vectors) and boosted learning to arrive at the initial ICF classifier. In the second and third rounds, the ICF classifier (element 300) from the previous round was applied on the background images, and "hard negatives", the regions that produce high classifier responses (e.g., classifier response higher than a set threshold of 0.9), were collected and added to the 50,000 random negative images to form an expanded negative training set. Then, an improved ICF classifier was trained through boosted learning. In each of these rounds, 15,000 hard negatives were collected. At the end of the third round, there is a completed ICF classifier (element 300) model.

For IR data only, the following steps are performed to the training data and training of the ICF classifier (element 300). Each input image undergoes a "blooming correction" (also called a non-uniform correction (NUC) process), which corrects the uneven intensity across the rows of IR images for some sensor, if applicable. Each input image undergoes dynamic range compression and reduces the pixel values from 16-bit format to 8-bit format, if applicable. For integral channel features, the base features will only include edge orientation, gradient magnitude, and intensity and will leave out U and V channels because of the lack of color information in IR.

(2.2.2) Convolutional Neural Net (CNN) Training (2.2.2.1) Electro-Optical (EO) Training Training of the convolutional neural networks (CNNs) was done using EO videos available from Army Night Vision and Electronic Sensors Directorate (NVESD). A baseline version and a deep version of CNN are trained using EO data. The deep CNN architecture is illustrated in FIG. 4. The baseline version has similar architecture but contains fewer convolution layers. Initially, the same set of data was used for the baseline, including ~53,000 "hard negative" samples (hn1), and then using a new set with an extended set of "hard negative" (nontarget) samples of ~500,000. The table in FIG. 6 illustrates data sets used for training, validation, and testing for the baseline CNN and deep CNN. This is referred to as "hn1" data.

Results from training and testing on various data sets are shown in the table in FIG. 7. Specifically, FIG. 7 depicts performance of the CNN on validation and blind test sets. Both validation and blind test results were obtained on the data shown in the table of FIG. 6, while "Blind Test Hard Negative" is a set of separate hard negative "nontarget" image chips extracted from the sequestered test sequences. The training data used in the results of FIG. 7, referred to as "hn3", includes additional ~500,000 "hard negative" (nontarget) samples.

Regarding "hard negative" samples, when training the CNN started, there was not a set of "nontarget" samples that could be used in training. Therefore, random samples (both in position and size) were generated from the training sequences, and those that did not overlap with any ground truth target windows were kept as the "nontarget" set for training. However, the CNN trained this way was "weak" in that the false detections coming from the ICF (Stage 1)(element 300) of the cascade do not resemble these random "nontarget" images, and the CNN is not good at separating them from true targets. Therefore, to "boost-strap" the training, detections coming from ICF that do not overlap with ground truth (i.e., the false detections from ICF stage) were added as "hard negatives," because these are the false detections that are characteristic of the ICF stage (element 300), which will benefit CNN when used for training. The first set of ~53,000 such hard negatives were extracted from the training video sequences that resulted in "hn1" shown in the table in FIG. 6. An additional ~500,000 hard negatives were also extracted from the training sequences which were added to the "nontarget" set to form "hn3" mentioned in the table in FIG. 7. The "Blind Test Hard Negative" samples were extracted using the same approach but from the sequestered test sequences. This set contains over 1.6 million samples of which 100K were randomly selected and used for the test shown in the last column in FIG. 7.

Results in FIG. 7 show that with the training set shown in FIG. 6 (hn1), the deep CNN (depicted in FIG. 3) achieves similar performance as the baseline CNN, in part because the performance of the baseline CNN and the deep CNN are both near saturation (close to 100%). However, the larger capacity (having more trainable parameters compared with the baseline CNN) of the deep CNN shines in the Blind Test Hard Negative test when it is trained with "hn3". As shown in the table of FIG. 7, bottom row, the test error of the deep CNN trained on hn3 on the Blind Test Hard Negative set drops by 14 times to 0.1% from 1.41% achieved by the same CNN trained on hn1. This is very important for suppressing false detections coming from the ICF stage (element 300) and for achieving very low FPPI (false positives per image) for the overall system.

(2.2.2.2) IR Training

The table in FIG. 8 summarizes the data used to train a 2-class (MAN vs. nontarget) deep CNN in the latest round. This data set, nicknamed "hn2" for IR, was extracted using ground truth (for "MAN" (human: pedestrian/dismounted) targets), random background regions (i.e., "nontarget"), and the so-called "hard negatives". Hard negatives are selected from the false positive detections from the training sequences using the ICF classifier based detector (element 300). In FIG. 8, samples for training and validation come from the 66 IR training sequences, while the samples for test come from the 30 sequestered sequences.

The training and testing results are summarized in the table in FIG. 9. Validation accuracy of 99.63% and blind test accuracy of 99.30% was achieved. In addition, the CNN was also tested on the hard negatives (false positives from the ICF classifier based detector (element 300)) from the blind test sequences which were tallied in the training data shown in FIG. 8. Performance on these hard negatives represent the CNN's capability in rejecting false positives from the detector in the test sequences. Both an 8-bit version and a 16-bit version of the same set of hard negatives were tested. Note that the CNN does not do as well on the 8-bit version of the hard negative images as on the 16-bit version with which the CNN is trained.

(2.2.3) Integrated Cascade

All stages were integrated to enable running the system end-to-end with a single command on EO or IR videos. The integrated flow is illustrated in FIG. 3. The ICF detector 300 takes input image frames of the video (element 302), computes channel feature vectors, and applies the ICF classifier at multiple scales and across the entire image frame-by-frame. As a result, regions of images with confidence scores higher than a set threshold (e.g., >0.3) are passed to the next stage (element 306) along with the bounding box image information (location and size)(element 308). At this point, the threshold for the ICF classifier is set low enough to admit as many true targets as possible while allowing certain amounts of false detections, leaving the job of discriminating the true target objects to the next stage.

Figure 10:
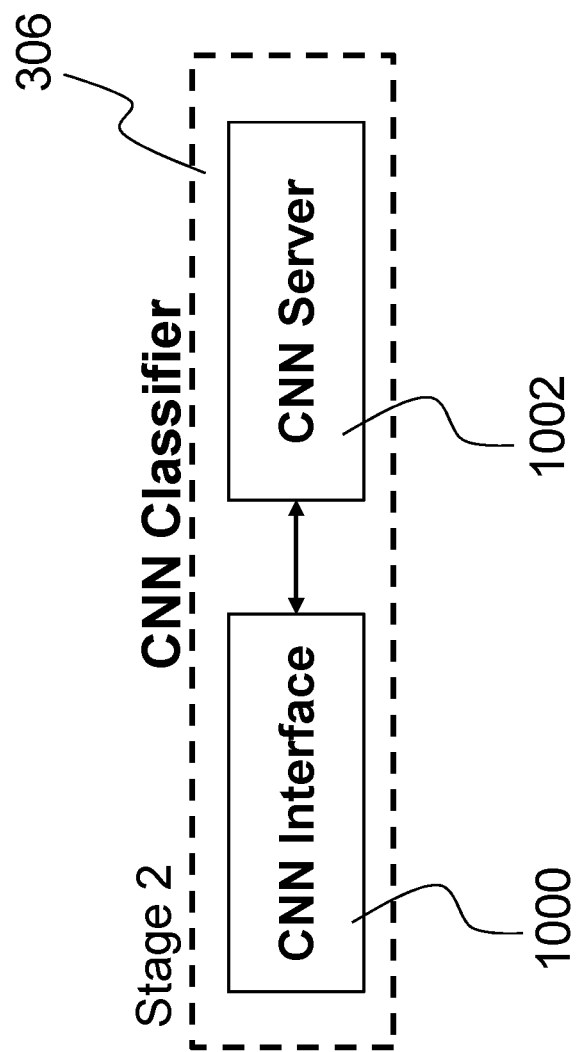
FIG. 10 is an illustration of the CNN classifier according to some embodiments of the present disclosure.

The CNN stage (element 306) is implemented as two interacting software modules, the CNN interface 1000 and the CNN server 1002, as depicted in FIG. 10. The CNN interface 1000 takes the candidate target box information (element 304) from the ICF detector (element 300), extracts the image regions from the input video (element 302), and hands that off to the CNN server 1002 for classification. When the results are received from the CNN server 1002, the CNN interface 1000 can display it live and also log the results to disk files. The CNN output (element 308) is represented as a class probability distribution over a set of pre-defined possible object classes plus background (or nontarget). The full class probability can be used to quantify the candidate target region, or one can take the class with the maximum probability as the "label" for the candidate region with its probability being the confidence of the decision. The detection and classification logs from the CNN (element 306) or MTT stage (element 310) can be used for subsequent performance analysis, such as to generate the ROCs (receiver operating characteristics), shown in FIGS. 11, 12, and 14.

For various embodiments, the software can run in EO or IR mode. In either mode, input video sequences are expected to be in some known video format (e.g., ARF or AVI format (preferably in MJPEG encoding)). In IR mode, grayscale input is expected, and if the input is in ARF 16-bit grayscale, the images are subject to blooming (non-uniform) correction and dynamic range compression (to fit in 8-bit internal representation) for object detection. In the EO mode, color RGB images are expected in either ARF (ARGB) or AVI format. In either mode, the output log files can be used for evaluation of system performance.

While the software is running, it can cause a display window to be opened on a visual display element (e.g., computer monitor) showing the input video with detection boxes labeled according to classification results. The software can also save the detection/classification results in a log file. For some embodiments, the software and demonstration system can run under Ubuntu Linux 14.04 and uses an NVIDIA GPU (graphics processing unit) to function. In test runs, it achieves near real-time speed of 5-10 frames per second (FPS) throughput on a Dell Alienware laptop with NVIDIA GTX 980M GPU and a quad-core Core i7 CPU @2.7 GHz.

(2.2.4) Performance Evaluation (EO)

Figure 11:
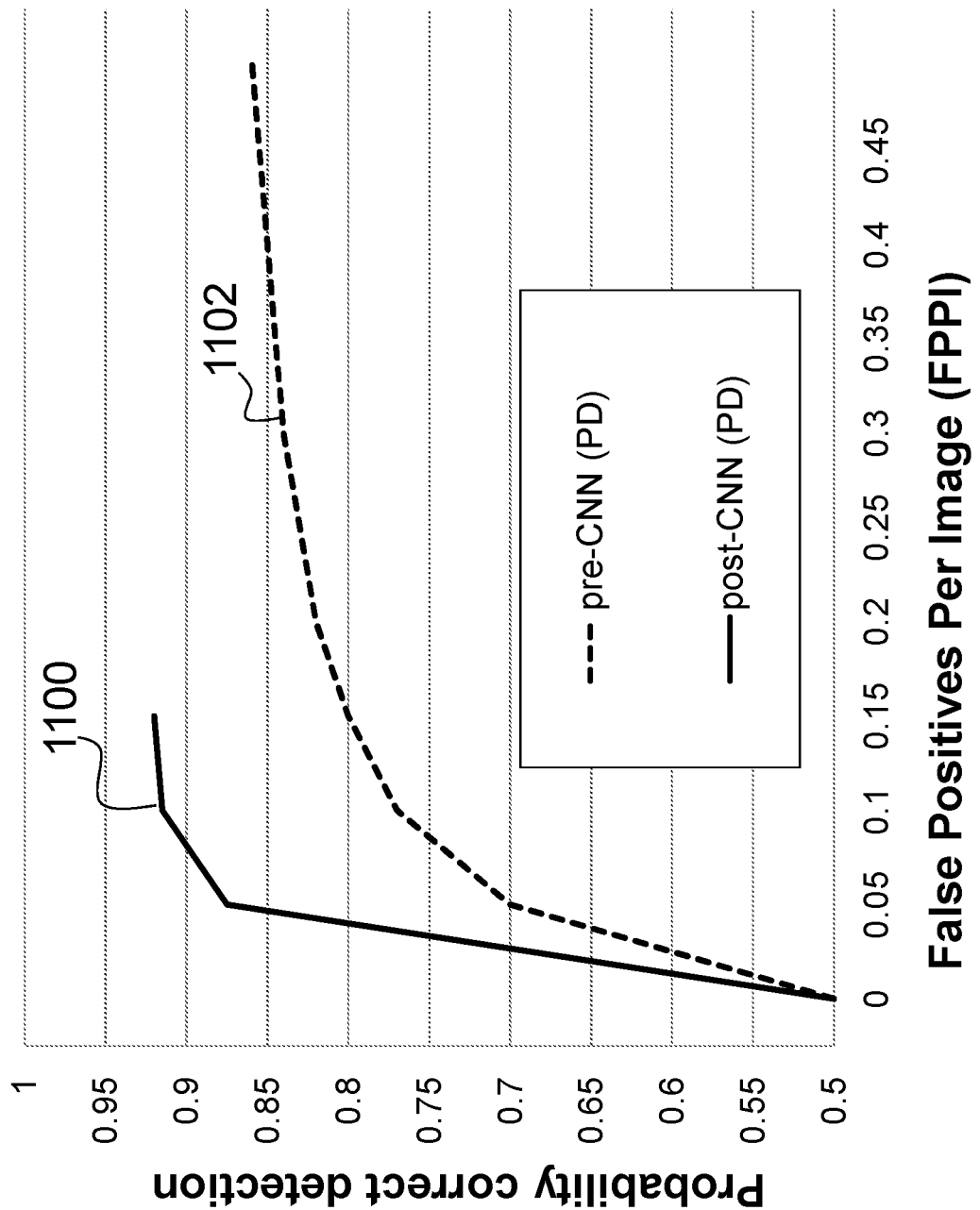
FIG. 11 is an illustration of performance evaluation for object classification according to some embodiments of the present disclosure.

Thirty test videos (15 j1co, 15 j2co videos) were sequestered from the Army NVESD dataset for the "blind" test performance evaluation. Data from these videos was not used during training. The performance of Stage 1 as well as the cascaded system with both Stage 1 and 2 in FIG. 3 was evaluated. The plots in FIG. 11 depict algorithm performance evaluation for "MAN" classification in 30 EO videos. The bold ROC curve 1100 shows the 2-stage (Stage 1 & 2) cascaded classifier performance with on 30 sequestered EO videos. The dashed ROC curve 1102 represents the Stage 1 performance (pre-CNN). The bold ROC curve 1100 represents the performance of the both Stage 1 and 2 (post-CNN). As determined from these ROCs, the cascaded system with both stages (represented by the bold ROC curve 1100) not only results in a higher maximum Pd (probability of detection), but also achieved a lower FPPI at the Pd. At 90% Pd level, the FPPI according to embodiments of the present disclosure is about 0.08.

(2.2.5) Performance Evaluation (IR)

Figure 12A:
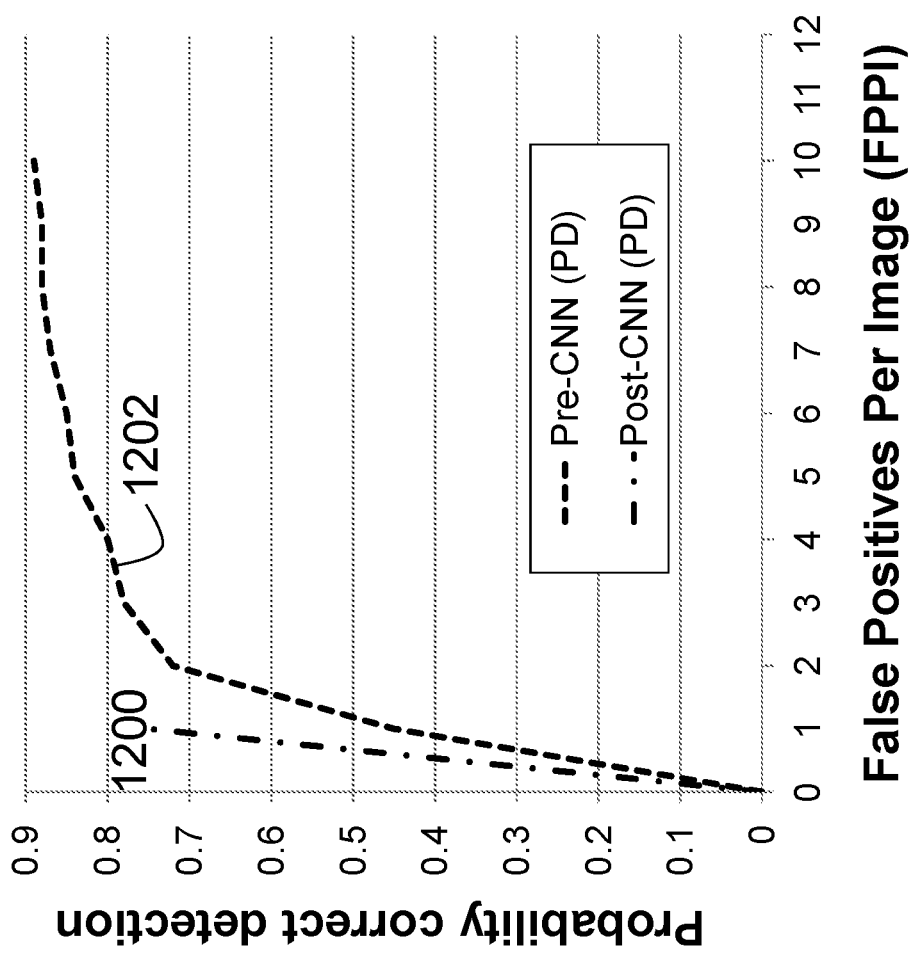
FIG. 12A is an illustration of receiver operating characteristic (ROC) curves before and after CNN classification according to some embodiments of the present disclosure.
Figure 12B:
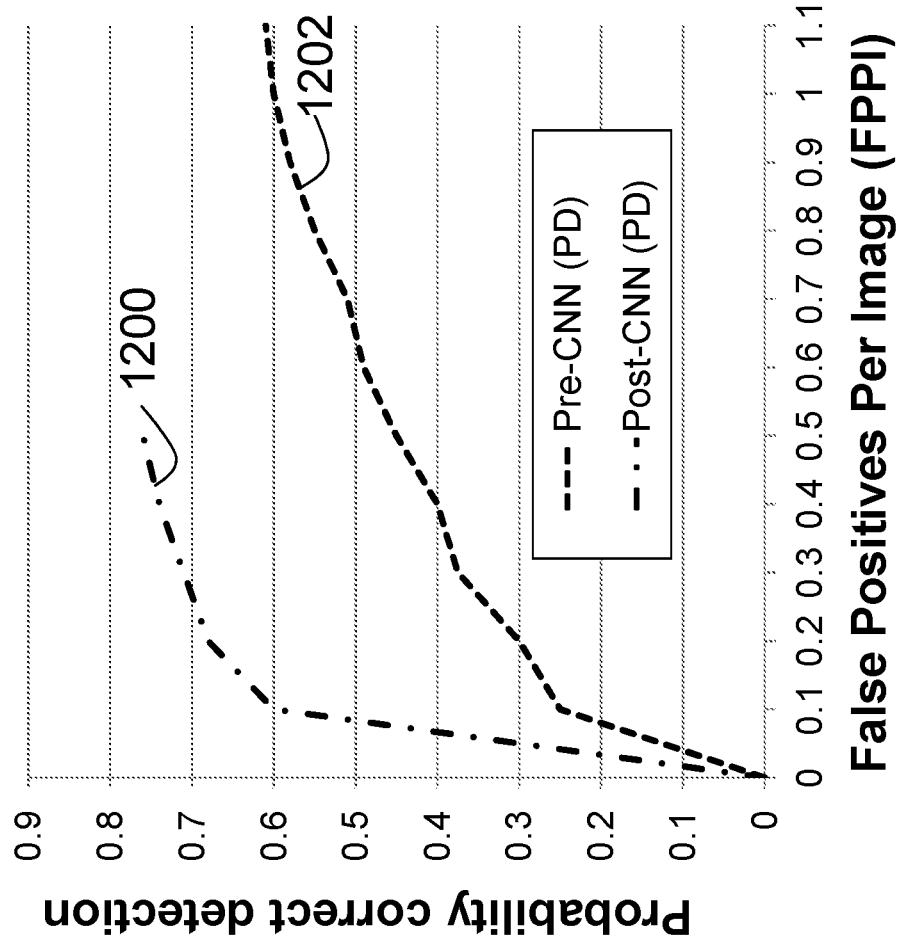
FIG. 12B is an illustration of an enlarged view of the ROC curves of FIG. 12A according to some embodiments of the present disclosure.

Additionally, the entire pipeline for "MAN" target recognition in 30 sequestered IR videos (15 h1co, 15 h2co videos) was evaluated. Data from these videos was not used during training. The performance of the first stage as well as the cascaded system with both stages was evaluated. The final recognition (post-CNN classification) and the detection ROC (pre-CNN classification) are shown in FIGS. 12A and 12B. FIG. 12A depicts the overall ROCs, and FIG. 12B depicts an enlarged view of the low FPPI region of FIG. 12A. In both FIGS. 12A and 12B, the curve 1200 shows the final cascaded classifier performance on 30 sequestered IR videos, and the curve 1202 shows pre-CNN classification. As depicted in FIG. 12B, from the same Pd level (e.g., 0.7), CNN processing on detected MAN targets can effectively reduce FPPI by a factor of roughly 9 times (FPPI decreases from 1.8 to 0.2).

(2.2.6) Tracker Performance Evaluation

Figure 13:
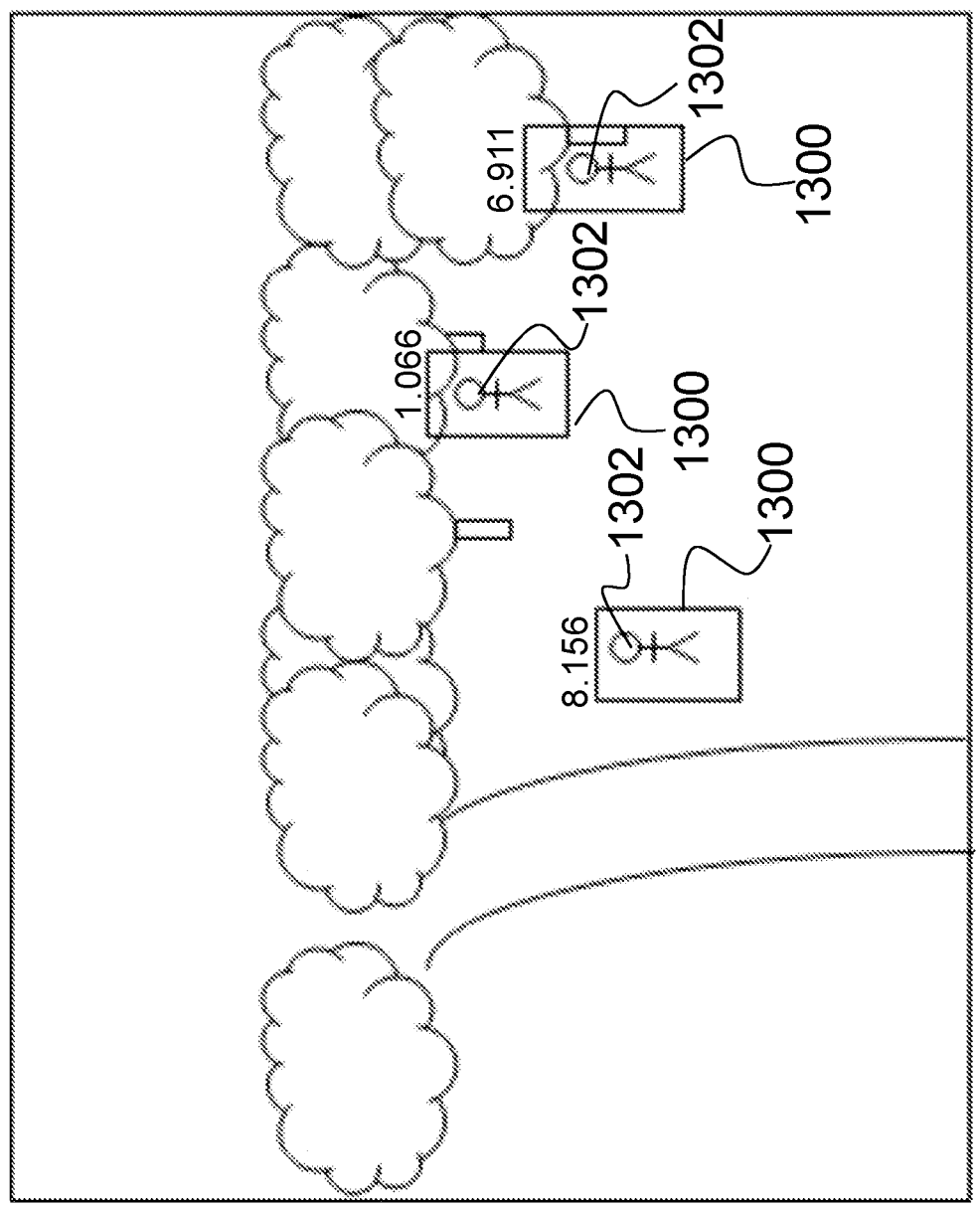
FIG. 13 is an illustration of an example screen snapshot of results of the multi-target tracker according to some embodiments of the present disclosure.
Figure 14:
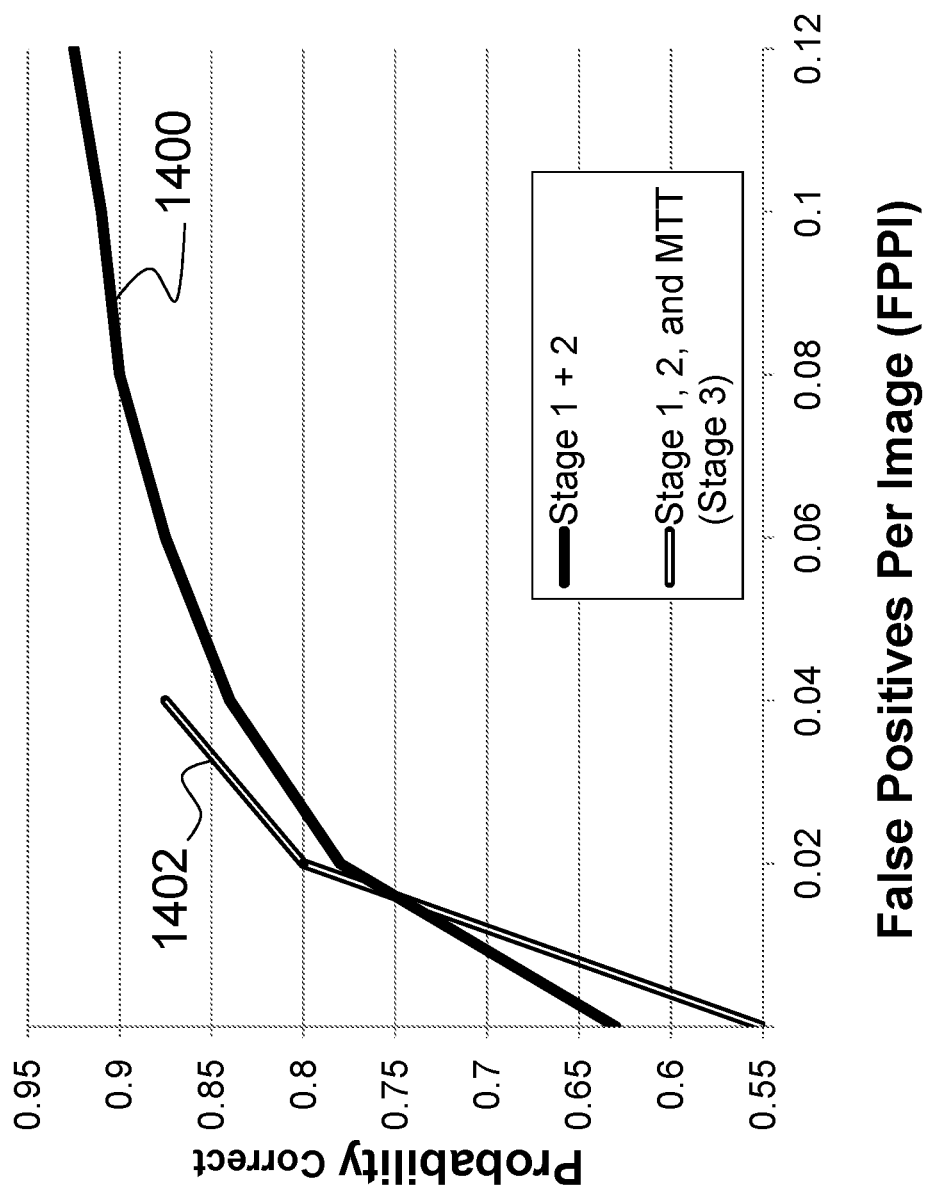
FIG. 14 is an illustration of ROC curves comparing pre-tracker and post-tracker results for an EO sequence according to some embodiments of the present disclosure.

FIG. 13 depicts a screen snapshot of example results of the multi-target tracker according to embodiments of the present disclosure. FIG. 14 shows an example ROC curve comparing pre-tracker (curve 1400) results and post-tracker (curve 1402) results for one EO sequence. As shown, the tracker improves performance on this sequence at high Pd values (>80%), which is the primary domain of interest.

The invention described herein allows EO or IR vision-based object/target recognition in real-time even on small, low power, low cost platform (such UAVs and UGVs). This approach is also amendable for implementation on emerging spiking neuromorphic hardware, for example, a neuromorphic chip. The system according to embodiments of the present disclosure can be used in intelligence, surveillance, and reconnaissance (ISR) operations, border security, and mission safety, such as for UAV based surveillance, human activity detection, threat detection, and distributed mobile operations. For example, for a military application, the classified object output can be used to alert the driver/team that there is a high-confidence "MAN" target and its location. The vehicle can then take evasive action or attack that target after manual confirmation of its danger. For a remotely operated vehicle, it can also provide a similar alert.

Additionally, the system can be embedded in assisted operation vehicles with human operators and autonomous robotic vehicles, such as UAVs and UGVs, and self-driving vehicles. For instance, in a self-driving vehicle, the system can be used for collision avoidance. In this example, if the system detects an object in its path (e.g., a pedestrian, another vehicle), an alert may be sent to the vehicle operating system to cause the vehicle to perform a braking operation. Alternatively, the alert may signal that the vehicle operating system should perform a swerving motion around the object, involving steering and accelerating operations or any other operations as required to provide for collision avoidance. Further, the object detected may be a road sign, such as a stop sign. After classification of the stop sign, an alert can be sent to the vehicle operating system causing the vehicle to brake or otherwise adhere to the message as conveyed by the road sign. The system may also be configured to perform a vehicle operation through direct control of steering, braking, or throttle controls rather than providing an alert to a human or another mechanical system.

Figure 15:
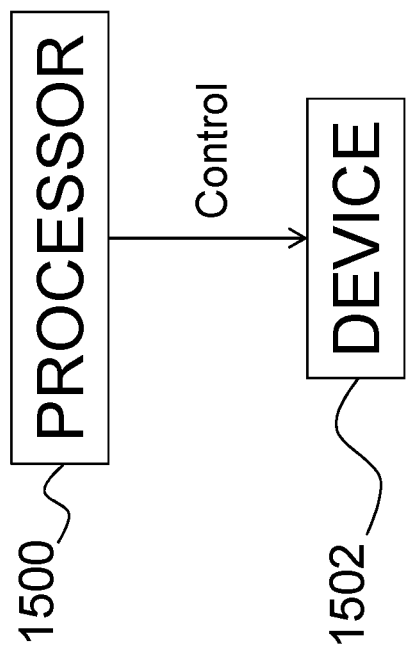
FIG. 15 is a flow diagram illustrating control of devices based on classification of a target object according to some embodiments of the present disclosure.

FIG. 15 is a flow diagram illustrating using a processor 1500 to control a device 1502 based on classification of an object as a target. Non-limiting examples of devices 1502 that can be controlled via the processor 1500 and the classification of the target object include a vehicle or a vehicle component, such as a brake, acceleration/deceleration controls, a steering mechanism, suspension, or safety device (e.g., airbags, seatbelt tensioners, etc.), or any combination thereof. Further, the vehicle could be an unmanned aerial vehicle (UAV), an autonomous ground vehicle, or a human operated vehicle controlled either by a driver or by a remote operator.

As can be appreciated by one skilled in the art, control of other device types is also possible given classification of an object as a target and the corresponding circumstances in which the system is employed. For example, the device may be a display that is controlled to visually identify a classified object, such as by placing an open box around or a highlighted color over the image of the classified object. Text may also be placed near or on the image of the displayed object. The color or brightness of the classified object may also be affected, such as by darkening, brightening, or otherwise altering the color of the displayed object.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. An object recognition system, the system comprising: one or more processors and a non-transitory computer-readable medium having executable instructions encoded thereon such that when executed, the one or more processors perform operations of:
utilizing a three-stage cascaded classifier for classifying an object, wherein utilizing the three-stage cascaded classifier comprises:
training an integral channel feature (ICF) detector offline using decision trees and a boosted learning approach;
applying the trained ICF detector to an input image of a scene in a first stage of the cascaded classifier to learn a plurality of candidate target regions, wherein each candidate target region represents a candidate object,
wherein the ICF detectors use at least an oriented edges channel and a magnitude of gradients channel, wherein each channel is a sum of pixel values over a rectangular region within the candidate target region;
in a second stage of the cascaded classifier, applying a trained convolutional neural network (CNN) classifier to the input image of the scene and the candidate target regions, resulting in a plurality of initially classified objects; and
using a multi-target Kalman filter tracker in a third stage of the cascaded classifier, tracking the initially classified objects, resulting in a classification output; and
controlling a device based on the classification output.

2. The system as set forth in claim 1, wherein learning candidate target regions comprises computing channel feature vectors for image frames of a video, and wherein, for each image frame, the ICF detector of the first stage of the cascaded classifier is applied at multiple image scales and across the entire image frame.

3. The system as set forth in claim 1, wherein the CNN classifier is implemented as interacting software modules comprising a CNN interface and a CNN server, wherein the CNN interface displays results received from the CNN server.

4. The system as set forth in claim 1, wherein the trained CNN classifier is used for both electro-optical (EO) and infrared (IR) image classification.

5. The system as set forth in claim 1, wherein the one or more processors further perform an operation of comparing at least one candidate target region to the classification output of the multi-target Kalman filter tracker to determine if further classification by the CNN classifier is needed.

6. The system as set forth in claim 5, wherein the classification output of the multi-target Kalman filter tracker includes a tracker bounding box, and wherein if no candidate target regions overlap a tracker bounding box by an overlap threshold, then the tracker bounding box is sent to the CNN classifier for further classification.

7. The system as set forth in claim 1, wherein the one or more processors further perform an operation of training the ICF detector for learning the candidate target region by:
generating positive training samples by extracting ground-truth samples of a target object from a set of training videos;

generating negative training samples by extracting a set of images from background images in the set of training videos that contain no ground-truth objects; and in a first round of training, extracting a set of random image regions from the background images, resulting in a set of random negative images, and using feature vectors extracted from the positive training samples and the set of random negative images.

8. The system as set forth in claim 7, wherein in additional rounds of training, the one or more processors further perform operations of:

applying the ICF detector on the background images containing no target objects and extracting a set of regions that produce classifier responses higher than a set threshold, resulting in a set of hard negatives;

adding the set of hard negatives to the set of random negative images to generate an expanded negative training set; and generating the trained ICF detector using feature vectors extracted from the positive training samples and the expanded negative training set.

9. A computer implemented method for object recognition, the method comprising an act of:

causing one or more processers to execute instructions encoded on a non-transitory computer-readable medium, such that upon execution, the one or more processors perform operations of:

utilizing a three-stage cascaded classifier for classifying an object, wherein utilizing the three-stage cascaded classifier comprises:

training an integral channel feature (ICF) detector offline using decision trees and a boosted learning approach;

applying the trained ICF detector to an input image of a scene in a first stage of the cascaded classifier to learn a plurality of candidate target regions, wherein Ah candidate target region represents a candidate object, wherein the ICF detectors use at least an oriented edges channel and a magnitude of gradients channel, wherein each channel is a sum of pixel values over a rectangular region within the candidate target region;

in a second stage of the cascaded classifier, applying a trained convolutional neural network (CNN) classifier to the input image of the scene and the candidate target regions, resulting in a plurality of initially classified object; and using a multi-target Kalman filter tracker in a third stage of the cascaded classifier, tracking the initially classified objects, resulting in a classification output; and controlling a device based on the classification output.

10. The method as set forth in claim 9, wherein learning candidate target regions comprises computing channel feature vectors for image frames of a video, and wherein, for each image frame, the ICF detector of the first stage of the cascaded classifier is applied at multiple image scales and across the entire image frame.

11. The method as set forth in claim 9, wherein the one or more processors further perform an operation of comparing at least one candidate target region to the classification output of the multi-target Kalman filter tracker to determine if further classification by the CNN classifier is needed.

12. The method as set forth in claim 11, wherein the classification output of the multi-target Kalman filter tracker includes a tracker bounding box, and wherein if no candidate target regions overlap a tracker bounding box by an overlap threshold, then the tracker bounding box is sent to the CNN classifier for further classification.

13. The method as set forth in claim 9, wherein the one or more processors further perform an operation of training the ICF detector for learning the candidate target region by:

generating positive training samples by extracting ground-truth samples of a target object from a set of training videos;

generating negative training samples by extracting a set of images from background images in the set of training videos that contain no ground-truth objects; and in a first round of training, extracting a set of random image regions from the background images, resulting in a set of random negative images, and using feature vectors extracted from the positive training samples and the set of random negative images.

14. The method as set forth in claim 13, wherein in additional rounds of training, the one or more processors further perform operations of:

applying the ICF detector on the background images containing no target objects and extracting a set of regions that produce classifier responses higher than a set threshold, resulting in a set of hard negatives;

adding the set of hard negatives to the set of random negative images to generate an expanded negative training set; and generating the trained ICF detector using feature vectors extracted from the positive training samples and the expanded negative training set.

15. A computer program product for object recognition, the computer program product comprising:

computer-readable instructions stored on a non-transitory computer-readable medium that are executable by a computer having one or more processors for causing the processor to perform operations of:

utilizing a three-stage cascaded classifier for classifying an object, wherein utilizing the three-stage cascaded classifier comprises:

training an integral channel feature (ICF) detector offline using decision trees and a boosted learning approach;

applying the trained ICF detector to an input image of a scene in a first stage of the cascaded classifier to learn a plurality of candidate target regions, wherein each candidate target region represents a candidate object, wherein the ICF detectors use at least an oriented edges channel and a magnitude of gradients channel, wherein each channel is a sum of pixel values over a rectangular region within the candidate target region;

in a second stage of the cascaded classifier, applying a trained convolutional neural network (CNN) classifier to the input image of the scene and the candidate target regions, resulting in a plurality of initially classified object; and using a multi-target Kalman filter tracker in a third stage of the cascaded classifier, tracking the initially classified objects, resulting in a classification output; and controlling a device based on the classification output.

16. The computer program product as set forth in claim 15, wherein learning candidate target regions comprises computing channel feature vectors for image frames of a video, and wherein, for each image frame, the ICF detector of the first stage of the cascaded classifier is applied at multiple image scales and across the entire image frame.

17. The computer program product as set forth in claim 15, further comprising instructions for causing the one or more processors to further perform an operation of comparing at least one candidate target region to the classification output of the multi-target Kalman filter tracker to determine if further classification by the CNN classifier is needed.

18. The computer program product as set forth in claim 17, wherein the classification output of the multi-target Kalman filter tracker includes a tracker bounding box, and wherein if no candidate target regions overlap a tracker bounding box by an overlap threshold, then the tracker bounding box is sent to the CNN classifier for further classification.

19. The computer program product as set forth in claim 15, further comprising instructions for causing the one or more processors to further perform an operation of training the ICF detector for learning the candidate target region by:
  generating positive training samples by extracting ground-truth samples of a target object from a set of training videos;
  generating negative training samples by extracting a set of images from background images in the set of training videos that contain no ground-truth objects; and
  in a first round of training, extracting a set of random image regions from the background images, resulting in a set of random negative images, and using feature vectors extracted from the positive training samples and the set of random negative images.

20. The computer program product as set forth in claim 19, wherein in additional rounds of training, the one or more processors further perform operations of:
  applying the ICF detector on the background images containing no target objects and extracting a set of regions that produce classifier responses higher than a set threshold, resulting in a set of hard negatives;
  adding the set of hard negatives to the set of random negative images to generate an expanded negative training set; and
  generating the trained ICF detector using feature vectors extracted from the positive training samples and the expanded negative training set.

\* \* \* \* \*